(12) United States Patent
Mueller et al.

(10) Patent No.: US 7,980,497 B2
(45) Date of Patent: Jul. 19, 2011

(54) PULPER FOR COMMINUTING AND SUSPENDING PAPER STOCK AND ITS USE

(75) Inventors: Wolfgang Mueller, Weingarten (DE); Andreas Steidele, Ravensburg (DE); Gert Gottschalk, Ravensburg (DE); Roland Reinhold, Ravensburg (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 12/483,472

(22) Filed: Jun. 12, 2009

(65) Prior Publication Data

US 2009/0272828 A1 Nov. 5, 2009

Related U.S. Application Data

(63) Continuation of application No. PCT/EP2007/009204, filed on Oct. 24, 2007.

(30) Foreign Application Priority Data

Dec. 12, 2006 (DE) .......................... 10 2006 000 514

(51) Int. Cl.
B02C 23/36 (2006.01)
(52) U.S. Cl. .................................................. 241/46.17

(58) Field of Classification Search ................. 241/46.17
See application file for complete search history.

(56) References Cited

U.S. PATENT DOCUMENTS

| 3,043,526 A | * | 7/1962 | Cowles ...................... 241/46.17 |
| 3,295,769 A | * | 1/1967 | Nilsson ...................... 241/46.11 |
| 3,342,425 A | * | 9/1967 | Morton ...................... 241/46.17 |
| 4,199,110 A | * | 4/1980 | Eriksson ........................ 241/20 |
| 6,508,422 B2 | * | 1/2003 | Wickensberg et al. .... 241/46.17 |
| 2006/0273208 A1 | | 12/2006 | Iwashige |

FOREIGN PATENT DOCUMENTS

| DE | 844116 | 7/1952 |
| DE | 1122361 | 1/1962 |
| DE | 3234702 A1 | 3/1984 |
| DE | 3429514 A1 | 2/1986 |
| DE | 3638993 A1 | 7/1987 |

* cited by examiner

*Primary Examiner* — Mark Rosenbaum
(74) *Attorney, Agent, or Firm* — Taylor IP, P.C.

(57) ABSTRACT

A pulper is used to comminute and suspend paper stock. The pulper includes a container that is open at the top and has a cylindrical side wall and a driven rotor, which is arranged eccentrically with respect to the center of the container. The bottom of the container can be provided with one or more truncated cones.

28 Claims, 2 Drawing Sheets

PULPER FOR COMMINUTING AND SUSPENDING PAPER STOCK AND ITS USE

CROSS REFERENCE TO RELATED APPLICATIONS

This is a continuation of PCT application No. PCT/EP2007/009204, entitled "PULPER FOR COMMINUTING AND SUSPENDING PAPERMAKING MATERIAL, AND ITS USE", filed Oct. 24, 2007, which is incorporated herein by reference.

BACKGROUND OF THE INVENTION

1. Field of the Invention

The present invention relates to pulper and method for comminuting and suspending paper stock.

2. Description of the Related Art

Pulpers of this type are mainly used to put air-dry pulp material or waste paper into suspension. The material put in large pieces, webs or compressed bales is mixed intensively with water, for which purpose a mixing and comminuting rotor is generally used. A pulper substantially comprises a container for the suspension and the rotor previously mentioned. In many cases, it also contains a screen in the bottom region, through which the suspension can be pumped away.

Understandably, such pulpers are optimized continually, the aim essentially being pulping that is quick and economical in terms of power. As a standard type for a pulper, a cylindrical container standing upright having a rotor in the bottom region has become widespread. In this container, water and stock to be pulped are added from above and, with the aid of the rotor, a funnel flow is produced in the suspension, in which, therefore, in the central region, the stock is sucked downwards by the rotor and is forced radially outwards in the bottom region, which results in a circulatory flow. Flow measures are also known in order to control this circulatory flow. For example, by means of appropriate internal flow fittings (flow breakers) on the container wall, the peripheral flow is braked, since this flow furnishes only a small contribution to the pulping. On the other hand, the promotion of the actual circulation, that is to say the repeated transport of the stock to be pulped into the rotor region, provides an improvement to the effect.

Attempts are also made to incorporate the stock freshly put into the suspension as quickly as possible. For these reasons, much development has been carried out on the rotors and containers of the pulpers.

In DE 196 01 497 A1 it has been proposed to configure the container of the pulper to be angular, in order to improve the entrainment of the stock. A further improvement should be effected by the asymmetrical arrangement of the rotor. However, these pulpers have not been widely employed.

Another attempt to improve pulpers of this type is shown by DE 36 38 993 C2. According to this text, the flow of the suspension is produced with the aid of a rotor fitted laterally. The oblique positioning of the rotor axis has already been carried out, e.g. in a pulper shown by DE 32 34 702 C2, in which a rotor fitted relatively high assumes an acute angle with respect to the vertical.

In order to improve the circulation, unconventional paths have also been followed, such as, according to DE 34 29 514 C2, a plurality of complicated rotors within the saure pulper container.

What is needed in the art is a more efficient pulper, without substantial additional expenditure, improving the entrainment of the material.

SUMMARY OF THE INVENTION

Specifically, it has been shown that, due to the special shape of the container and the arrangement of the rotor, faster entrainment of the paper stock put in and an improvement in the circulation are possible. The entire pulping operation proceeds more quickly, which has the effect of better machine utilization and a saving in energy. The improved pulping effect may be determined by the faster reduction in the content of specks in the fiber suspension.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
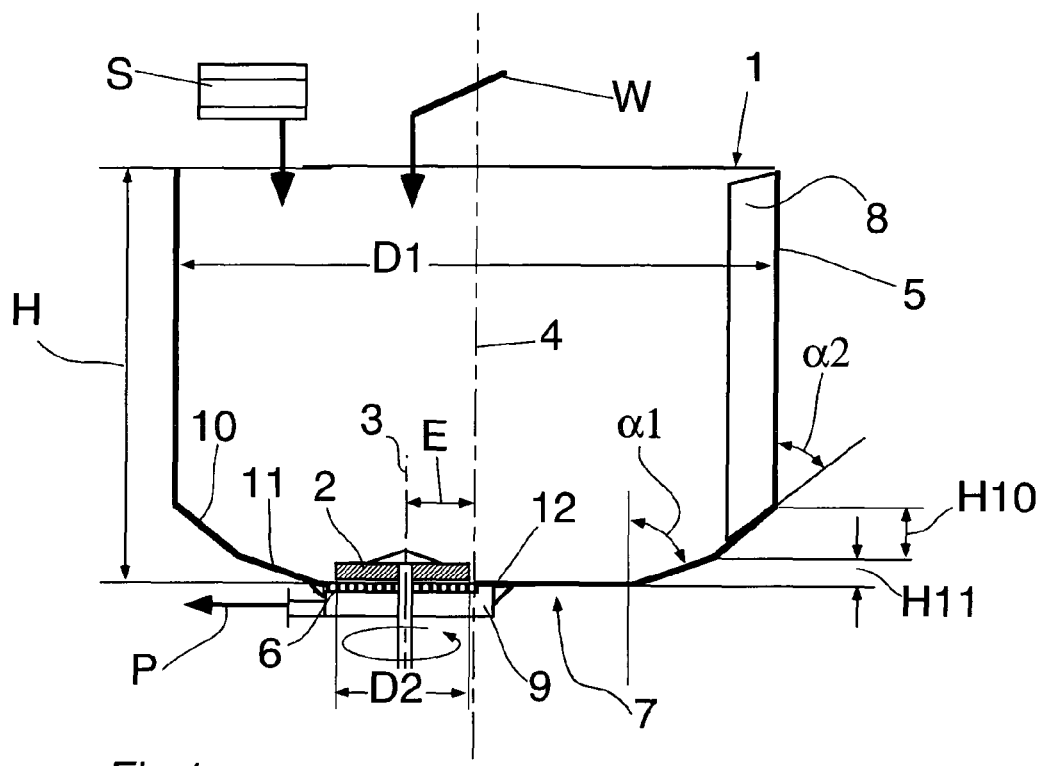
FIG. 1 schematically illustrates a section through a pulper according to the present invention, side view.

Referring now to the drawings, and more particularly to FIG. 1, there is shown a section through the pulper of the present invention wherein paper stock S is put into container 1 open at the top together with water W. During operation of the pulper there is in container 1 a mixture of water and paper stock, which to some extent has already been comminuted. This suspension, provided with coarse and fine 30 solids, is set circulating by rotor 2 arranged in the bottom region of container 1. The rotor is driven by a motor, not shown. Center line 3 of rotor 2 is arranged to be offset laterally with respect to vertical center line 4 of container 1. Eccentricity E of this offset in the case of cylindrical container 1 is 5 to 20% of diameter D1 of container 1.

The suspension is drawn downwards by rotor 2, which means that a flow directed downwards is produced approximately along center line 3 of rotor 2. As a result of the pumping action of the rotor, the suspension at the bottom of container 1 is conveyed radially outwards and as a result reaches side wall 5. Overall, a circulating flow is produced as a result. During this pulping operation, the comminution and suspension of the paper stock is effected by hydraulic forces and by contact between rotor 2 and paper stock. Parts of the paper stock which have been comminuted sufficiently can pass through screen plate 6 into chamber 9 and can be led away as a fiber-containing suspension P. Such a pulper can be operated both continuously and discontinuously. Screen plate 6 is not absolutely necessary. The usual proportion of solids in suspension P is generally around 3 to 6% but is not restricted thereto.

The eccentric rotor arrangement develops its beneficial effect if bottom 7 of container 1—outside the region of the screen—has a truncated cone or a plurality of truncated cones 10 and 11 joined to one another, the largest of which adjoins side wall 5 of the container with its largest diameter and which are arranged in such a way that their internal diameters become smaller from top to bottom. In this way, therefore, the contour of the pulper is joined to horizontal disc 12, terminating the container at the bottom, with the aid of a plurality of conical parts which taper towards the bottom. One compromise between expenditure and effect is the design having a total of two truncated cones. Then, for example, upper truncated cone 10 can have its smallest diameter between 70% and 90%, and the lower truncated cone can have between 40% and 60%, of diameter D1 of container 1, in order to obtain a beneficial flow in the pulper.

On the inner side of side wall 5 of container 1 located opposite rotor 2 there is vertical flow barrier 8 which, in a simple design, can be constructed as a rectangular angled profile which extends vertically from bottom 7 of container 1 until it is above the level of the suspension forming during operation. Flow barrier 8 reaches into the trough with radial projection F which is at least 5%, for example at least 10%, of diameter D1 of container 1.

Figure 2:
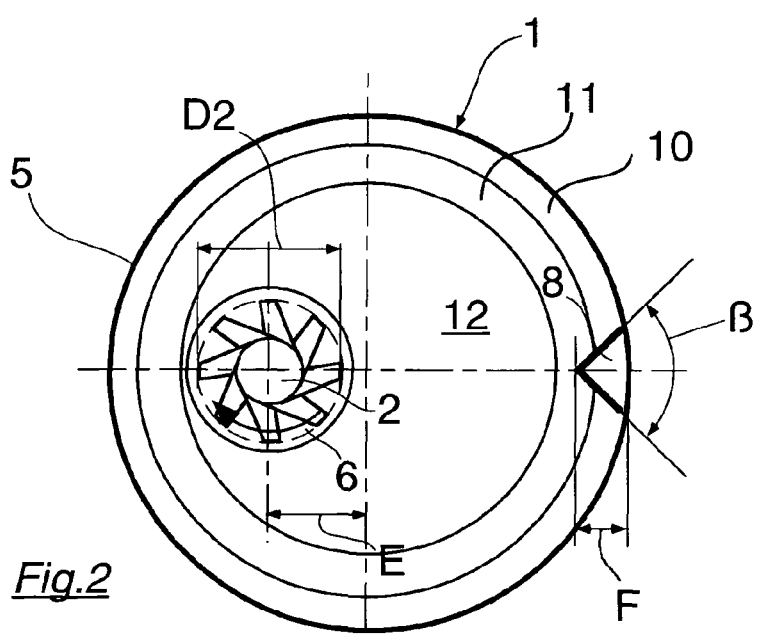
FIG. 2 depicts the pulper of FIG. 1, view from above.

For the purpose of illustration, FIG. 2 depicts a pulper which is similar to that in FIG. 1 in a view from above. In this case, the holes in screen plate 6 are not shown. Flow barrier 8 has a significant influence on the operation of the pulper. By means of the number and position of one or more flow barriers, the specific conditions under which the pulper is intended to operate can be taken into account. Since the pulper according to the present invention can, in principle, be used both for the pulping of fresh pulp and for that of waste paper, the configuration of the pulper can be matched to the intended use. For instance, fresh pulp, which in suspended form has a substantially higher viscosity than waste paper, can be pulped with the pulper according to the present invention if side wall 5 has no barriers braking the peripheral flow.

Figure 3:
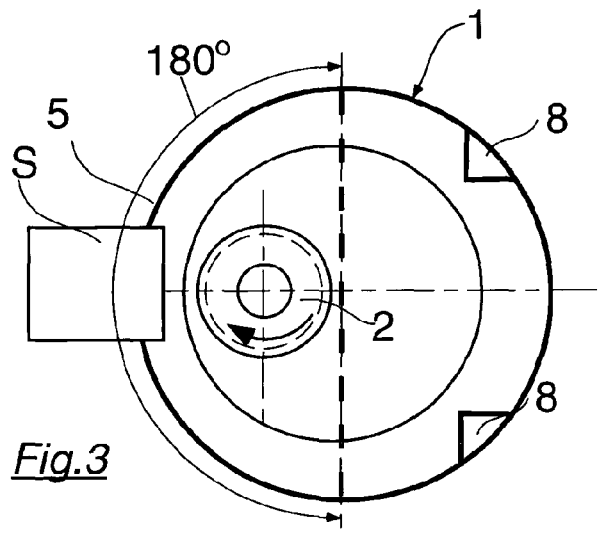
FIG. 3 illustrates a sketch relating to the loading of the pulper during continuous pulping.
Figure 4:
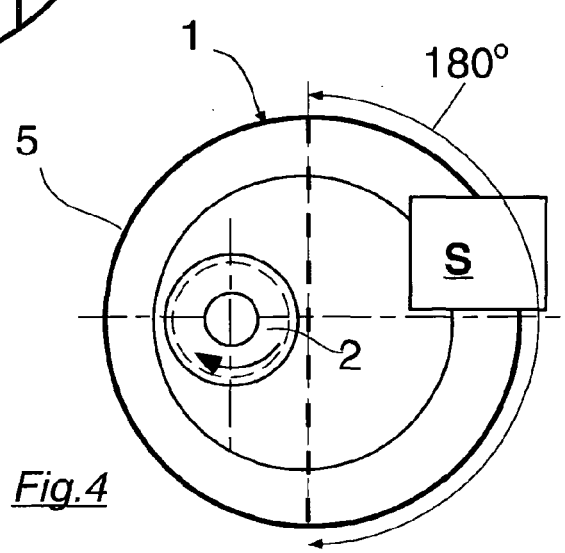
FIG. 4 illustrates a sketch relating to the loading of the pulper during discontinuous pulping.

Furthermore, the input into the pulper can be carried out at different points depending on whether the pulping is to be carried out continuously or discontinuously. For example, FIG. 3 illustrates use of the pulper for the continuous pulping of waste paper, which is typically enriched with fillers and possible contamination, and moreover normally also contains beaten fibers. In this case, paper stock S is thrown into the 180° sector of the pulper, in the center of which radius 13 of container 1 extending through the center of rotor 2 is located. The 180° sector means a part of the pulper of the present invention which is constituted as a semicircle as viewed from above. In the case of discontinuous pulping, for example of fresh pulp, the procedure can be in accordance with FIG. 4, in which paper stock S is thrown into the 180° sector which is located opposite the 180° sector in the center of which radius 13 of container 1 extending through the center of rotor 2 is located. In the case of continuous operation paper stock S is thrown in the opposite side as compared with pulping with discontinuous operation.

Figure 5:
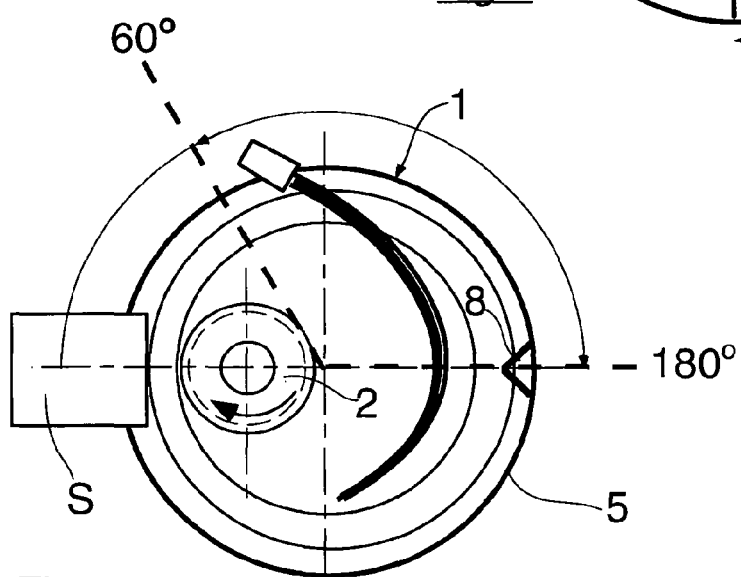
FIG. 5 illustrates a sketch relating to the ragger situation.

In a typical use of the pulper according to the present invention, rope 14 is pulled out of its trough. The technique of ragging uses the property of baling wires and larger contaminants (plastic films) to become attached to a rope, therefore to be spun with the latter, as a result of the rotational flow. The rope is normally pulled out automatically by rope removal device 15. It is precisely in the case of ragger operation that the pulper according to the present invention has substantial advantages, since the eccentricity of rotor 2, in particular in conjunction with bottom 7 having a plurality of double cones, creates beneficial conditions for rope 14. For example, space can specifically be created in the pulper for the rope in order that it can be built up to be as long as possible without getting into the region of the rotor. As a result of contact between the rope and the rotor there is the risk that part of the rope will be knocked off and block the bottom region of the pulper. As FIG. 5 illustrates, this advantage can be realized by use being made of ragger device 15 which pulls the rope out of part of container 1 which lies outside 60° sector 16 which is located after the center of rotor 2 as seen in the direction of rotation of the rotor 2. This part of the container can be located in a sector between 90° and 300°, for example 90° to 180°, after (in the direction of rotation) container radius 13 extending through the center of the rotor.

In particular in the case of continuous pulper operation, rope (14) is pulled out of a part of container (1) which lies in a sector between 90° and 300°, for example 90° to 180°, after the point at which paper stock (S) is thrown in, as seen in the direction of rotation of rotor (2).

A pulper according to the present invention can be provided with the following dimensions, for example. Container 1 of this pulper has trough height H of 2500 mm and cylindrical side wall 5 of which diameter is D1=3500 mm. Eccentricity E is around 10% of diameter D1, therefore about 350 mm. Rotor 2 has external diameter D2 of 1100 mm at its moving vanes. It runs closely above flat screen 6 in the form of a circular ring, the openings of which it keeps free of blockages. Bottom 7 of the pulper is provided with two truncated cones. On the side of side wall 5 that is furthest removed from the center line of rotor 2 there is fitted flow barrier 8, specifically in the form of a rectangular angled profile which extends vertically from bottom 7 approximately as far as the upper edge of container 1 and projects into the container with radial projection F=400 mm. Other cases, in particular larger pulpers, can be imagined with which the present invention can be implemented at least equally well.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pulper for comminuting and suspending paper stock, said pulper comprising:
    a container having a substantially cylindrical side wall and a bottom including at least one truncated cone concentric with said substantially cylindrical side wall, said container being configured to mix the paper stock with water and to comminute and suspend the paper stock to form a suspension containing the paper stock and said at least one truncated cone being a plurality of truncated cones joined to one another and including a largest truncated cone having a largest diameter adjoining said side wall, said plurality of truncated cones being arranged such that an internal diameter of each of said plurality of truncated cones decreases from top to bottom; and
    a driven rotor positioned at said bottom of said container, said driven motor configured to produce a circulating flow in said container and a center of said rotor arranged eccentrically to a center of said container.

2. The pulper according to claim 1, wherein a center line of said rotor is vertical.

3. The pulper according to claim 1, wherein a center line of said cylindrical side wall is vertical.

4. The pulper according to claim 3, wherein said eccentricity with which said rotor stands respective to said center of said container is between approximately 5% and 20% of a diameter of said container.

5. The pulper according to claim 1, wherein said at least one truncated cone is concentric with said cylindrical side wall.

6. The pulper according to claim 5, further comprising a horizontal disc configured to terminate said container at said bottom, said plurality of truncated cones including a lower truncated cone having a smaller cross section joined to said horizontal disc.

7. The pulper according to claim 6, wherein said plurality of truncated cones is two truncated cones.

8. The pulper according to claim 7, wherein said two truncated cones include an upper truncated cone having a smallest diameter between approximately 70% and 90% of said diameter of said container.

9. The pulper according to claim 7, wherein a diameter of said lower truncated cone is between approximately 40% and 60% of said diameter of said container.

10. The pulper according to claim 9, wherein each of said plurality of truncated cones has a height, a sum of said heights being between approximately 20% and 60% of a trough height of said container.

11. The pulper according to claim 10, wherein said lower truncated cone has a half cone angle of at least 50° with respect to a center line of said container.

12. The pulper according to claim 11, wherein said half cone angle of said lower truncated cone has half cone is 70° with respect to said center line of said container.

13. The pulper according to claim 12, wherein said upper truncated cone has a half cone angle of between approximately 30° and 60° with respect to said centerline of said container.

14. The pulper according to claim 13, wherein said half cone angle of said upper truncated cone is between approximately 35° and 45° with respect to said centerline of said container.

15. The pulper according to claim 14, wherein a diameter of said rotor is between approximately 15% and 50% of said diameter of said container.

16. The pulper according to claim 15, wherein a ratio of said diameter of said container to said trough height of said container is between approximately 1 and 2.4.

17. The pulper according to claim 16, wherein said ratio of said diameter of said container to said trough height of said container is between approximately 1.6 and 2.

18. The pulper according to claim 17, wherein an inner side of said side wall has an absence of flow barriers for braking circumferential flow of the paper stock and water.

19. The pulper according to claim 17, further comprising at least one vertical flow barrier on said side wall.

20. The pulper according to claim 19, wherein one of said at least one vertical flow barrier projects into said container with a radial projection of at least 5% of said diameter of said container.

21. The pulper according to claim 20, wherein said one of said at least one vertical flow barrier projects into said container with a radial projection of at least 10% of said diameter of said container.

22. The pulper according to claim 21, wherein said one of said at least one vertical flow barrier projects into said container with a radial projection of at least 20% of said diameter of said container.

23. The pulper according to claim 22, wherein said container has a 180° sector furthest removed from said rotor, said 180° sector including at least one of said at least one flow barrier.

24. The pulper according to claim 23, wherein at least one of said at least one flow barrier is positioned at a point of said container furthest removed from said rotor.

25. The pulper according to claim 24, wherein said at least one flow barrier is a single flow barrier having a radial projection of at least 5% of said diameter of said container.

26. The pulper according to claim 24, wherein said at least one flow barrier is two flow barriers, each of said two flow barriers having a radial projection of at least 5% of said diameter of said container.

27. The pulper according to claim 26, wherein said at least one flow barrier includes a vertically angled profile having limbs joined to said side wall.

28. The pulper according to claim 14, further comprising a flat annular screen positioned at said bottom and arranged horizontally and concentrically with said rotor and a chamber configured to hold and lead away a suspension formed in said container, said chamber being positioned beneath said flat annular screen.

* * * * *